(12) United States Patent
Lee et al.

(10) Patent No.: US 7,826,432 B2
(45) Date of Patent: Nov. 2, 2010

(54) APPARATUS AND METHOD FOR ROUTING ON A MOBILE AD-HOC NETWORK

(75) Inventors: Keun-jae Lee, Seoul (KR); Min-soo Kim, Seoul (KR); Song-yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1016 days.

(21) Appl. No.: 11/318,540

(22) Filed: Dec. 28, 2005

(65) Prior Publication Data

US 2006/0146720 A1 Jul. 6, 2006

(30) Foreign Application Priority Data

Dec. 31, 2004 (KR) ...................... 10-2004-0118025

(51) Int. Cl.
*H04W 4/00* (2009.01)
(52) U.S. Cl. ...................................................... 370/338
(58) Field of Classification Search ................. 370/338, 370/349, 229, 232, 235, 236, 238, 310, 328, 370/351, 389
See application file for complete search history.

(56) References Cited

U.S. PATENT DOCUMENTS

| | | | | |
|---|---|---|---|---|
| 5,987,011 | A * | 11/1999 | Toh | 370/331 |
| 6,760,314 | B1 * | 7/2004 | Iwata | 370/254 |
| 2002/0122413 | A1 * | 9/2002 | Shoemake | 370/349 |
| 2003/0179742 | A1 | 9/2003 | Ogier et al. | |
| 2004/0022223 | A1 * | 2/2004 | Billhartz | 370/338 |
| 2005/0088972 | A1 * | 4/2005 | Zhang et al. | 370/235 |

FOREIGN PATENT DOCUMENTS

KR 10-2004-0013744 A 2/2004

OTHER PUBLICATIONS

Keun Jae Lee; Min Soo Kim; Song Yean Cho; Byung In Mun, "Delay-Centric Link Quality Aware OLSR," Local Computer Networks, 2005. 30th Anniversary. The IEEE Conference on , vol., No., pp. 690-696, Nov. 17, 2005.*

* cited by examiner

*Primary Examiner*—Derrick W Ferris
*Assistant Examiner*—Omar Ghowrwal
(74) *Attorney, Agent, or Firm*—Sughrue Mion, PLLC

(57) ABSTRACT

An apparatus and method for routing on a mobile ad-hoc network are provided. The apparatus and method allow each node in a network to: measure a packet transmission rate to a neighboring node using a signal-to-noise ratio (SNR); measure variation in the number of nodes due to their insertion or deletion; distribute relative packet transmission time relative to the SNR, which is measured using the packet transmission rate; and determine a routing path using the stored relative packet transmission time relative to the SNR. The apparatus includes a transceiver that receives a reply packet from a neighboring node, a measuring unit that uses the reply packet to measure movement of the neighboring node and a relative packet transmission time thereto, and a routing path determination unit that uses the relative packet transmission time to determine a routing path in the network.

16 Claims, 8 Drawing Sheets

| DESTINATION NODE | NEXT NODE | HOP COUNT |
|---|---|---|
| B | B | 1 |
| C | C | 1 |
| D | D | 1 |
| E | E | 1 |
| F | C | 2 |
| G | B | 2 |
| H | B | 3 |
| I | C | 3 |
| J | C | 3 |

| SNR | 1 Mbps | 2 Mbps | 5.5 Mbps | 11 Mbps |
|---|---|---|---|---|
| 2 | - | - | - | - |
| 3 | 94.3 | 5.7 | 0.0 | 0.0 |
| 4 | 81.8 | 17.6 | 0.0 | 0.6 |
| 5 | 71.8 | 23.7 | 4.4 | 0.0 |
| 6 | 45.3 | 39.4 | 13.7 | 1.5 |
| 7 | 31.0 | 38.7 | 23.9 | 6.3 |
| 8 | 18.5 | 31.2 | 26.4 | 24.0 |
| 9 | 11.2 | 23.8 | 23.4 | 41.6 |
| 10 | 6.8 | 18.1 | 19.1 | 56.0 |
| 11 | 3.6 | 12.3 | 10.8 | 73.4 |
| 12 | 3.1 | 7.0 | 6.8 | 83.1 |
| 13 | 1.1 | 3.4 | 3.8 | 91.7 |
| 14 | 0.8 | 1.8 | 2.8 | 94.6 |
| 15 | 0.7 | 0.8 | 1.8 | 96.6 |
| 16 | 0.0 | 0.0 | 1.2 | 98.8 |
| 17 | 0.0 | 0.0 | 0.0 | 100.0 |
| 18 | 0.0 | 0.0 | 0.0 | 100.0 |
| 19 | 0.0 | 0.0 | 0.0 | 100.0 |

[μsec]

|  | 1 Mbps | 2 Mbps | 5.5 Mbps | 11 Mbps |
|---|---|---|---|---|
| DIFS | 50 | 50 | 50 | 50 |
| Backoff | 310 | 310 | 310 | 310 |
| Data | 11444 | 5722 | 2081 | 1040 |
| SIFS | 10 | 10 | 10 | 10 |
| ACK | 53 | 53 | 53 | 53 |
| 1 Cycle | 11867 | 6145 | 2504 | 1464 |

FIG. 9

| SNR | PACKET TRANSMISSION TIME [μsec] |
|---|---|
| 2 | - |
| 3 | 11540.52 |
| 4 | 10798.75 |
| 5 | 10094.59 |
| 6 | 8167.26 |
| 7 | 6753.59 |
| 8 | 5120.42 |
| 9 | 3983.15 |
| 10 | 3220.86 |
| 11 | 2524.13 |
| 12 | 2180.49 |
| 13 | 1780.98 |
| 14 | 1660.21 |
| 15 | 1597.59 |
| 16 | 1476.02 |
| 17 | 1463.78 |
| 18 | 1463.78 |
| 19 | 1463.78 |

APPARATUS AND METHOD FOR ROUTING ON A MOBILE AD-HOC NETWORK

CROSS-REFERENCE TO RELATED APPLICATION

This application is based upon and claims the benefit of priority from Korean Patent Application No. 10-2004-0118025 filed on Dec. 31, 2004 in the Korean Intellectual Property Office, the disclosure of which is incorporated herein by reference in its entirety.

BACKGROUND OF THE INVENTION

1. Field of the Invention

Devices, systems, and methods consistent with the invention are related to routing in a mobile ad-hoc network, and more particularly, to routing in a mobile ad-hoc network that allows each node in a network to: measure a packet transmission rate using a signal-to-noise ratio (SNR) to its neighboring node, measure a variation in the number of neighboring nodes due to their insertion or deletion; distribute a relative packet transmission time relative to the SNR, which is measured using the packet transmission rate; and determine a routing path using the stored relative packet transmission time relative to the SNR.

2. Description of the Related Art

With the drastic advancement of computer technologies and wireless communication technologies, improved mobile wireless computers using Internet Protocol (IP) communication are expected to gain increasing popularity. In the wake of this trend, mobile ad-hoc networks are emerging to support robust and efficient operation. These mobile ad-hoc networks have multi-hop topologies which are composed of relatively bandwidth-constrained wireless links.

To enable communication between any two nodes in a mobile ad-hoc network environment, a data packet must be routed through multiple hops between the two nodes.

Routing for packet switching in a mobile ad-hoc network environment consisting of mobile nodes connected by wireless links differs from routing in a wired environment in that a dynamic network topology variation frequently occurs and the quality of a link between nodes varies continuously in time and space domains.

FIG. 1 illustrates a related art connection between nodes.

The goal of a mobile ad-hoc network is to extend mobility of a node. A node is connected to a router and another node, thereby forming a network routing infrastructure in an ad-hoc fashion.

When an ad-hoc network is formed as shown in FIG. 1, a node A can send a packet to another node (e.g., B-J) along a path determined according to a routing table, such as is shown in FIG. 2.

FIG. 2 shows a routing table for the node A shown in FIG. 1, which is stored at the node A. Using this routing table, the node A selects a path with the minimum number of hops, from the stored paths, and sends a data packet according to the selected path.

An improved approach to this method is to first select a path by calculating a packet delivery rate or a packet error rate, and then send a data packet according to the selected path. The packet delivery rate or the packet error rate represents a ratio of the number of packets broadcast by every node in a network during a given period to the number of data packets normally received by each node from its neighboring nodes for a given period. Each node has a table storing packet delivery rates or packet error rates for all nodes, and can determine link quality using such a table to send a data packet.

Accordingly, there are two types of related art data packet routing methods between wireless nodes: (1) a routing method using the number of hops; and (2) a routing method using a packet delivery rate or a packet error rate.

However, the related art routing methods have drawbacks in that variations in link quality in the time and space domains cannot be reflected in the routing. For example, the routing method using the number of hops cannot guarantee link quality because a network environment varies with time and space. Further, the routing method using a packet delivery rate or a packet error rate presents a problem of inaccuracy when a node moves because the packet delivery rate or the packet error rate obtained by measuring the number of packets received from neighboring nodes for a certain period varies depending on the relative position of the node.

A further issue to be considered in the related art routing methods is illustrated in FIG. 3, which shows asymmetric communications performed when each node has a different wireless communication radius. In FIG. 3, node A 310, node B 320, node C 330, and node D 340 have different network radii. Here, since the node A 310 and the node C 330 lie within the radius of each other, it is possible to exchange data between the node A 310 and the node C 330. However, while the node B 320 is within the radius of the node A 310, the node A 310 is not within the radius of node B 320. Thus, the node A 310 can recognize the existence of the node B 320 and can send data to the node B 320, but the node B 320 cannot recognize the existence of the node A 310 and cannot send data to the node A.

Since a link between nodes is asymmetric due to multi-path fading and external interference in an actual mobile ad-hoc network environment, this property of the link should also be reflected in a routing method.

BRIEF SUMMARY OF THE INVENTION

The invention provides a device, system and method for allowing a node to find an optimum routing path in a network environment in which a transmission or reception link is asymmetric The invention also provides a device, system and method for allowing a transmitting node to find an optimum routing path even while a transmitting or receiving node is moving.

The invention also provides a device, system and method for reducing a packet transmission time by transmitting a packet through an improved routing path.

According to an aspect of the invention, there is provided an apparatus for routing on a mobile ad-hoc network including a transceiver that receives a reply packet from a neighboring node, a measuring unit that uses the reply packet to measure movement of the neighboring node and a relative packet transmission time thereto, and a routing path determination unit that uses the relative packet transmission time to determine a routing path in the network.

According to another aspect of the invention, there is provided a method for routing in a mobile ad-hoc network, including receiving a reply packet to the packet from a neighboring node, measuring movement of the neighboring node and relative packet transmission time thereto, and determining a routing path in the network using the relative packet transmission time.

BRIEF DESCRIPTION OF THE DRAWINGS

The above and other features and advantages of the invention will become more apparent by describing in detail exemplary embodiments thereof with reference to the attached drawings in which:

FIG. 1 illustrates a related art connection between nodes according to;

FIG. 2 shows a routing table for the node A shown in FIG. 1;

FIG. 7 illustrates multiple bit-rates relative to a signal-to-noise ratio (SNR) according to an exemplary embodiment of the invention;

FIG. 9 illustrates a packet transmission time relative to a SNR according to an exemplary embodiment of the invention;

DETAILED DESCRIPTION OF THE INVENTION

Figures 1, 2:
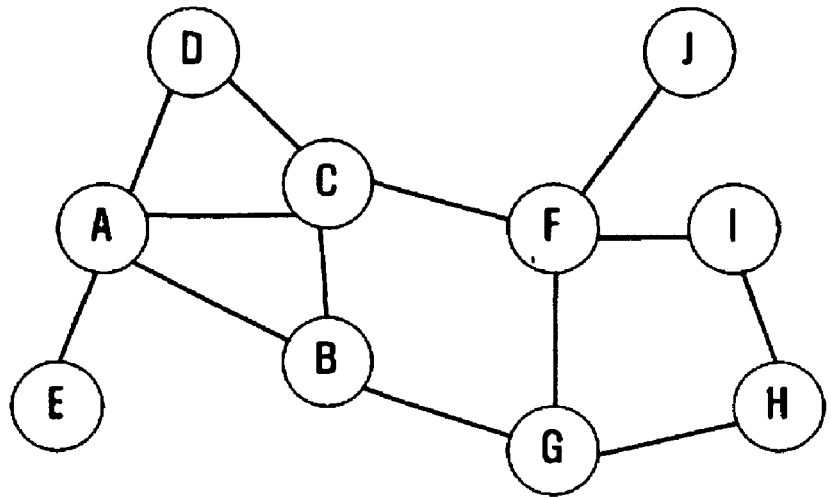
Figure 3:
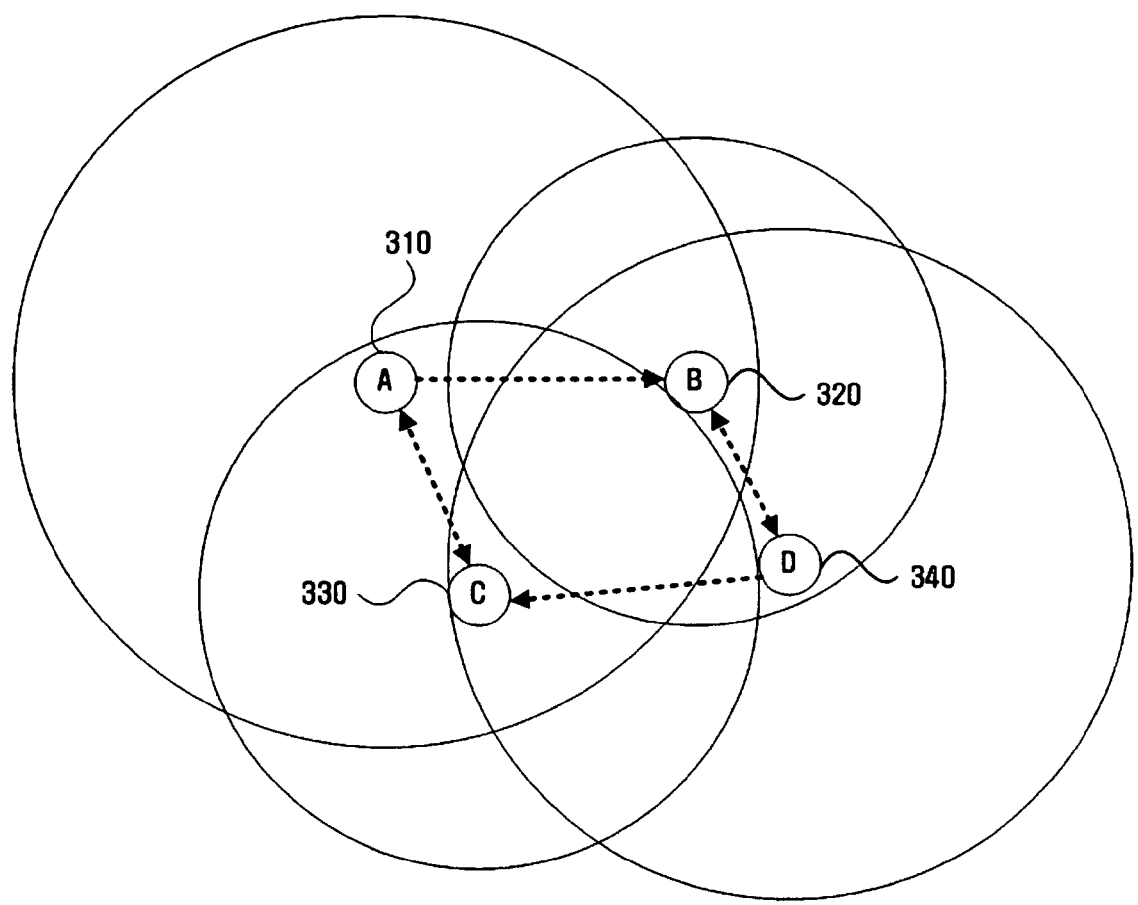
FIG. 3 shows asymmetric communications performed when each node has a different wireless communication radius.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout the specification.

Figure 4:
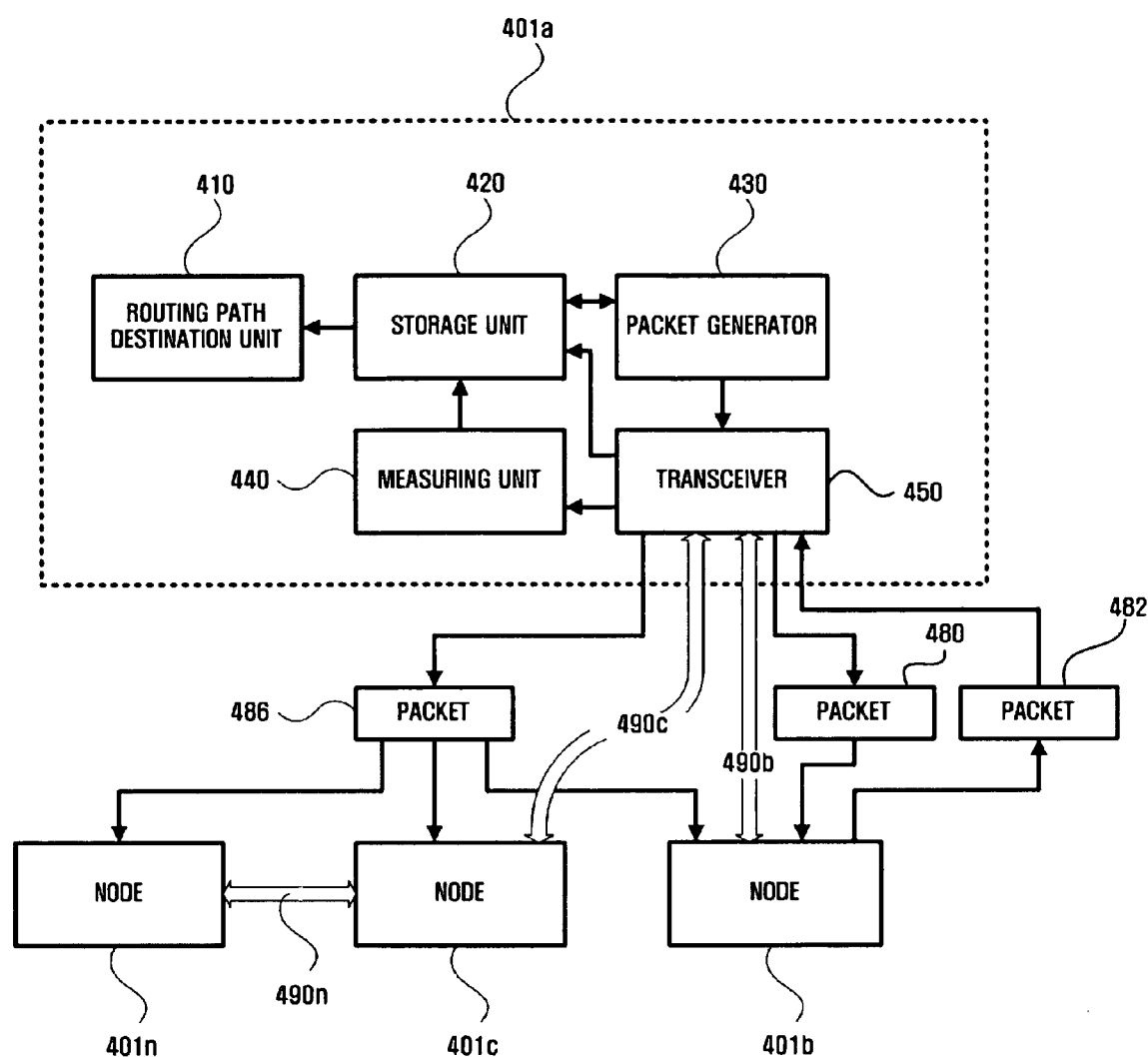
FIG. 4 is a block diagram of a wireless node according to an exemplary embodiment of the invention.

Referring to FIG. 4, a wireless node 401a according to an exemplary embodiment of the invention includes a storage unit 420, a packet generator 430, a routing path determination unit 410, a measuring unit 440, and a transceiver 450.

The storage unit 420 stores the movement status of the neighboring node 401b and the status of a network link (e.g., 490b, 490c) between the node 401a and a neighboring node (e.g., 401b, 401c).

Here, for example, the status of the link 490b between the node 401a and the neighboring node 401b contains relative packet transmission time measured between the node 401a and the neighboring node 401b during transmission and reception.

The packet generator 430 generates packets for measuring the status of the link 490b to the neighboring node 401b. The packets generated by the packet generator 430 are either a local packet 480 or a global packet 486. The local packet 480 is transmitted to the neighboring node 401b, while the global packet 486 is transmitted to all of the nodes 401b, 401c . . . 401n in a network.

The local packet 480 contains a packet number, addresses of the node 401a and the neighboring node 401b, movement status of the neighboring node 401b, a packet transmission rate, and a packet delivery rate. The global packet 486 contains a packet number, an address of the node 401a, and rates of transmission to and/or reception to from the neighboring node 401b.

Here, the local packet 480 is periodically broadcast from the node 401a to the neighboring node 401b to: (1) verify the status of the link 490b to the neighboring node 401b; and (2) measure a packet transmission rate and a packet delivery rate therebetween. When the local packet 480 is originally generated, the packet transmission rate field and the packet delivery rate field in the local packet 480 are empty. Then, when the node 401a forwards an original local packet 480 to the neighboring node 401b, the neighboring node 401b verifies the packet delivery rate, stores the packet delivery rate in its storage unit, and sends the node 401a a reply local packet 482 containing the packet delivery rate. The neighboring node 401b can also inform the status of the link 490b to the node 401a by sending a local packet containing information stored in the storage unit. The node 401a that has sent the original local packet 480 can obtain the packet delivery rate using the reply local packet 482 received from the neighboring node 401b. Because the packet delivery rate of the neighboring node 401b contained in the reply local packet 482 is equivalent to a packet transmission rate of the node 401a, the node uses the reply local packet 482 to know both the rates of packet transmission to and/or reception to from the neighboring node 401b.

The global packet 486 is used for each node to determine a routing path by sending the status the link 490b between the node 401a and its neighboring node 401b to all other nodes 401c . . . 401n in a network. Thus, the global packet 486 may be periodically distributed.

As described above, the global packet may contain rates of transmission to and/or reception from the neighboring node 401b and a relative packet transmission time measured by the measuring unit 440, which will be described in more detail later with reference to FIG. 5.

The transceiver 450 transmits the packets 480, 486 generated by the packet generator 430 and receives the reply local packet 482 to the local packet 480, which is then sent to the measuring unit 440.

The measuring unit 440 uses the reply local packet 482 received from the transceiver 450 to measure a packet delivery rate relative to a variation in the number of neighboring nodes 401b, 401c and a relative packet transmission time relative to a signal-to-noise ratio (SNR), in which the packet delivery rate has been reflected. The measuring unit 440 will be described more fully below with reference to FIG. 5.

The routing path determination unit 410 uses the status of the link 490b between the node 401a in a network and the neighboring node 401b, which is stored in the storage unit 420, to determine a routing path associated with a destination node 401n.

Each node 401a, 401b . . . 401n in a network measures and distributes the status of its respective links to a neighboring nodes during transmission and reception therebetween, i.e., relative packet transmission time, and stores the relative packet transmission time to each of the neighboring nodes. The routing path determination unit 410 uses the stored relative packet transmission time to each of the neighboring nodes to determine an optimum path for packet transmission to a destination node.

Here, the optimum routing path may be extracted using Dijkstra's algorithm or other network analysis algorithm.

Figure 5:
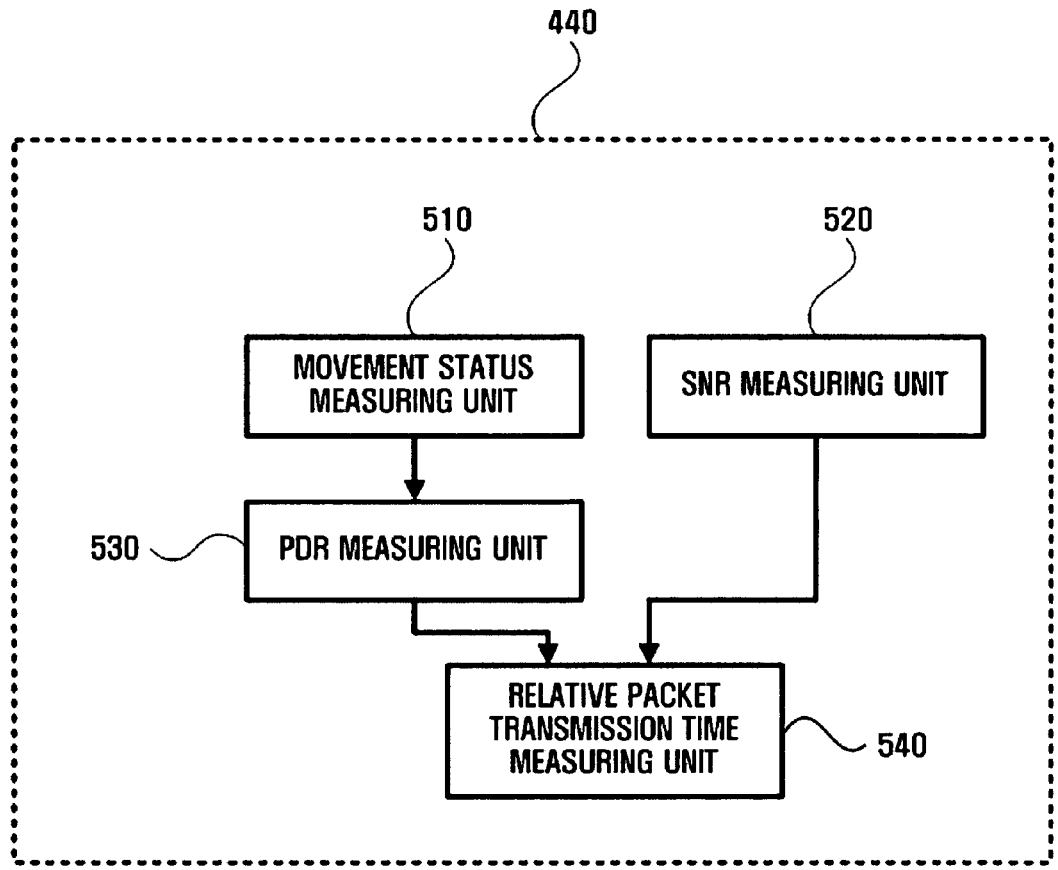
FIG. 5 is a block diagram of the measuring unit of the wireless node of FIG. 4 according to an exemplary embodiment of the invention.

FIG. 5 is a block diagram of the measuring unit 440 of the wireless node 401a according to an exemplary embodiment of the invention.

Referring to FIG. 5, the measuring unit 440 includes an SNR measuring unit 520, a movement status measuring unit 510, a packet delivery rate measuring unit 530, and a relative packet transmission time measuring unit 540.

The SNR measuring unit 520 measures an SNR of a local packet, relative to a neighboring node, which is received from the transceiver 450. The SNR can be calculated by measuring a received signal strength indication (RSSI). The measured SNR is used to measure a packet transmission time relative to the SNR.

The movement status measuring unit 510 measures the movement status of the neighboring nodes (and other nodes in the network) by calculating a variation in the number of neighboring nodes due to their insertion or deletion.

In other words (for example), the movement status of the neighboring nodes 401b, 401c . . . may be determined using the variation in the number of the neighboring nodes 401b, 401c . . . (and vice versa) relative to the node 401a, due to their insertion or deletion as available neighboring nodes. A static node has small variation in the number of neighboring nodes while a dynamic node has a large variation in the number of neighboring nodes.

A variation NV in the number of neighboring nodes is defined by the following equation:

$$NV = \frac{Node_{inserted} + Node_{deleted}}{Node_{total}} \quad (1)$$

$$(0 \; NV \; 1)$$

where $Node_{inserted}$, $Node_{deleted}$, and $Node_{total}$ respectively denote the number of neighboring nodes 401b, 401c . . . inserted after transmission of the last local packet, the number of neighboring nodes 401b, 401c . . . deleted after transmission of the last local packet, and the number of total neighboring nodes 401b, 401c . . . at the time of calculation.

For example, when the total number of neighboring nodes, the number of inserted neighboring nodes, and the number of deleted neighboring nodes are 4, 2, and 1, respectively, the number of total neighboring nodes at the time of calculation is 5. Thus, the variation NV in the number of neighboring nodes is 0.6 (3/5).

As described above, the number of neighboring nodes moved after transmission of the last local packet and before transmission of a next local packet is based on the number of inserted or deleted neighboring nodes. Thus, the movement status of a node classified as stopped or moving using the variation NV in the number of neighboring nodes may be updated continuously, and stored in the storage unit 420. Thus, in this embodiment, the packet delivery rate measuring unit 530 uses the movement status of the neighboring nodes 401b, 40ac . . . measured by the movement status measuring unit 510 to measure a packet delivery rate according to the status of movement of the nodes 401b, 401c . . . with respect to the node 401a.

The packet delivery rate is a ratio of the number of normally received packets to the total number of packets transmitted between neighboring nodes, and is calculated by using the number of packets normally received within a predetermined time range (i.e., a "packet window"). For example, when the size of a packet window is 8, the total number of transmitted packets is 8, and the number of normally received packets is 7, the packet delivery rate is 7/8. Thus, when a packet is transmitted from a node A to a node B, a packet delivery rate $PDR_{AB}(t)$ of the node B is given by the following equation $$PDR_{AB}(t) = \frac{P_{AB}(t)}{w_{AB}(t)} \quad (2)$$

$$(0 \; PDRAB(t) \; 1)$$

where $w_{AB}(t)$ is a packet window size for transmission from the node A to node B at time t, i.e., the total number of packets transmitted from the node A to the node B. When i is a packet transmission interval for the node A, $P_{AB}(t)$ denotes the number of packets normally received by the node B from the node A during a time between $t-(w_{AB}(t) \times i)$ and t and $PDR_{AB}(t)$ denotes a packet delivery rate for a time between $t-(w_{AB}(t) \times i)$ and t.

Since each node has high mobility in the mobile ad-hoc network of the invention, the above-described method of calculating the packet delivery rate needs modification, since it is normally used with respect to a static node. Thus, the invention considers only packets received after a node moves in calculating the packet delivery rate using the movement status of the node.

That is, the packet delivery rate measuring unit 530 checks the movement status of the node 401b stored in the storage unit 420 and measures a packet delivery rate using the movement status of the node 401b relative to the node 401a.

The relative packet transmission time measuring unit 540 then uses a packet delivery rate measured by the packet delivery rate measuring unit 530 and an SNR measured by the SNR measuring unit 520 to measure a relative packet transmission time.

In this embodiment, an 802.11 wireless network is used, which supports multiple data rates since a modulation technique used during packet transmission varies according to the quality of the channel between nodes. For example, 802.11b supports data rates of 1 Mbps, 2 Mbps, 5.5 Mbps, and 11 Mbps.

Further, a bit error rate for packet transmission varies according to the type of modulation. Specifically, a packet transmission rate and a bit error rate are high at a high data rate while they are low at a low data rate.

Thus, when packet transmission and reception is smooth over a channel between nodes, a packet may be transmitted at a high data rate. When packet transmission and reception is not smooth over a channel between nodes, a packet may be transmitted at a low data rate. In this way, multiple bit-rates may be considered in determining a routing path associated with a destination node.

In the invention, the condition of a channel between nodes is determined by an SNR measured by the SNR measuring unit.

FIG. 7 illustrates an experimental result representing a relationship between multiple bit-rates and an SNR according to an exemplary embodiment of the invention. As evident from FIG. 7, a data rate is low at low SNR while it is high at high SNR.

Figure 8:
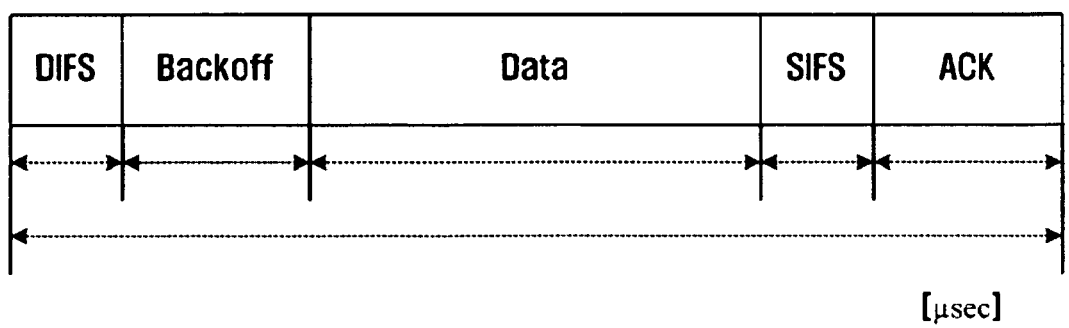
FIG. 8 illustrates a packet transmission time relative to bit-rates according to an exemplary embodiment of the invention.

A time required for transmitting a single data frame according to bit-rates is illustrated in FIG. 8. FIG. 8 shows the format of a data frame in a typical wireless network and a time required for transmitting each field relative to data rates. The data frame is a maximum transmission unit of 1,500 bytes. The maximum transmission unit is defined as the maximum number of bytes of data that may be transferred in a single frame using a typical wireless local area network (LAN).

DIFS, SIFS, and ACK in FIG. 8 are 802.11 standard values and Backoff is an average of typical Backoff values. Data is a value calculated using data size and data rate.

FIG. 9 illustrates a packet transmission time relative to the SNR obtained using the experimental results shown in FIGS. 7 and 8.

Using a packet delivery rate measured according to the movement status of a node and a packet transmission time relative to SNR, a relative packet transmission time $M_{AB}$ between nodes A and B is defined by the following equation:

$$M_{AB} = \frac{1}{PDR_{AB}} \times TT(SNR_{AB}) \qquad (3)$$

where $PDR_{AB}$ is a packet delivery rate of the node B that is the percentage of packets received by the node B to packets transmitted by the node A and $TT(SNR_{AB})$ is a packet transmission time of node B relative to SNR. Because $M_{AB}$ is obtained by multiplying the inverse of the packet delivery rate $PDR_{AB}$ by the packet transmission time $TT(SNR_{AB})$ relative to SNR, the relative packet transmission time $M_{AB}$ contains a retransmission time for packet transmission from the node A to the node B. For example, if the packet delivery rate relative to the status of movement from the node A to the node B is 1/2, a packet transmission time increases by a factor of two because retransmission occurs upon failure of original packet transmission, thereby increasing the relative packet transmission time by a factor of two.

Each node in a network measures relative packet transmission time, and forwards a global packet containing the measured relative packet transmission time to all other nodes.

Each node receiving the global packet verifies the status of link between nodes in the network and determines an optimum routing path.

Figure 6:
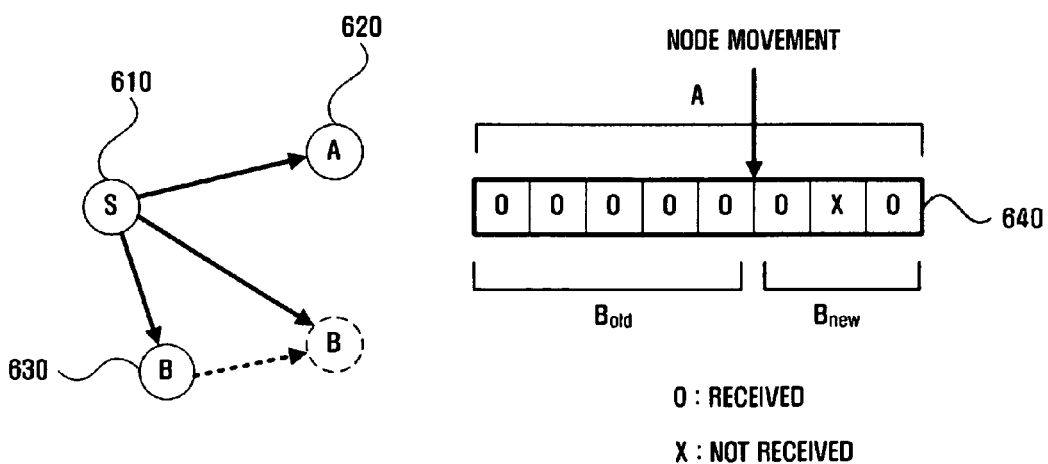
FIG. 6 is a diagram illustrating a method of measuring a packet delivery rate when a neighboring node moves according to an exemplary embodiment of the invention.

FIG. 6 is a diagram illustrating a method of measuring a packet delivery rate when a neighboring node moves according to an exemplary embodiment of the invention.

A typical packet delivery rate is calculated as the ratio of the number of packets actually received for a given period to the number of packets to be received for the same period. Thus, previous data received for a certain period affects the current packet delivery rate.

However, one problem with this approach is inaccuracy due to a difference in link quality between a time before a node moves and a time after the node moves in a mobile ad-hoc network environment. The invention solves this problem by adjusting the size of a packet window 640. In this case, the size of the packet window 640 may be adjusted within any range. The same range may apply to all nodes.

FIG. 6 shows an example in which a static node A 620 and a dynamic node B 630 receive packets from a transmitting node S 610.

In this example, the largest size of the packet window 640 is eight (8). Since node A 620 is static, when the node A 620 receives a packet from the transmitting node S 610, the entire packet window is used to calculate a packet delivery rate.

Since one (1) of eight (8) packets is not received, the packet delivery rate of the node A is 7/8.

In contrast, when the dynamic node B 630 receives a packet from a transmitting node S 610 while it is moving, only packets received after the node B 630 moves are considered in calculating a packet delivery rate of the node B 630. In other words, packets received during an interval $B_{old}$ before the node B 630 moves are not considered. Accordingly, the size of the packet window 640 is reduced to a minimum when the node 630 moves, and is thereafter increased gradually according to a new packet delivery interval. The packet delivery rate is calculated using only packets received during the new interval $B_{new}$. Thus, the packet delivery rate of the node B 630 after the node B moves is 2/3 since two of three packets have been normally received.

Figure 10:
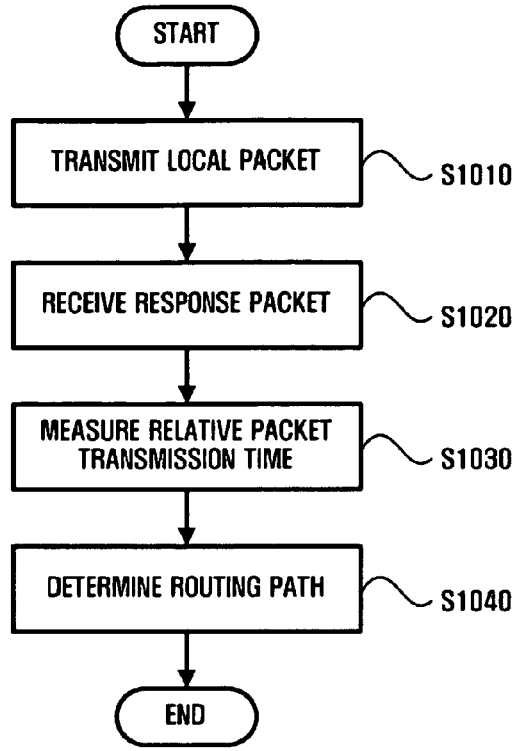
FIG. 10 is a flowchart illustrating a process of a wireless node determining a routing path according to an exemplary embodiment of the invention.

FIG. 10 is a flowchart illustrating a method whereby a wireless node determines a routing path, according to an exemplary embodiment of the invention. The method will be described with reference to FIGS. 4 and 10.

Referring to FIG. 10, in operation S1010, node 401a in a mobile ad-hoc network transmits a local packet 480 to measure the status of a link 490b to a neighboring node 401b. The neighboring node 401b that receives the local packet 480 verifies a packet delivery rate and sends the node 401a a reply local packet 482 containing the packet delivery rate.

In operation S1020, the node 401a that receives the reply local packet 482 verifies the packet delivery rate for the neighboring node 401b. Because the packet delivery rate of the neighboring node 401b contained in the reply local packet 482 corresponds to a packet transmission rate of the node 401a, the node uses the reply local packet 482 to know both the rates of packet transmission to, and reception from, the neighboring node 401b.

In operation S1030, the relative packet transmission time is measured by the measuring unit 440 using the reply local packet 482 received from the neighboring node 401b. To accomplish this, the measuring unit 440 first uses the reply local packet 482 received through the transceiver 450 to measure the movement status of the node 401b, SNR, and a packet delivery rate. The measuring unit 440 then uses the movement status of the node 401b, the SNR, and the packet delivery rate to measure the relative packet transmission time that is distributed to external nodes via the transceiver 450.

Each node in the network measures and distributes the status of a link to its neighboring node or nodes during transmission and reception, i.e., the relative packet transmission time, and stores the relative packet transmission time of external nodes in the storage unit 420.

In operation S1040, the wireless node 401a uses the stored relative packet transmission time of the other nodes 401b, 401c . . . 401n to determine an optimum routing path.

Figure 11:
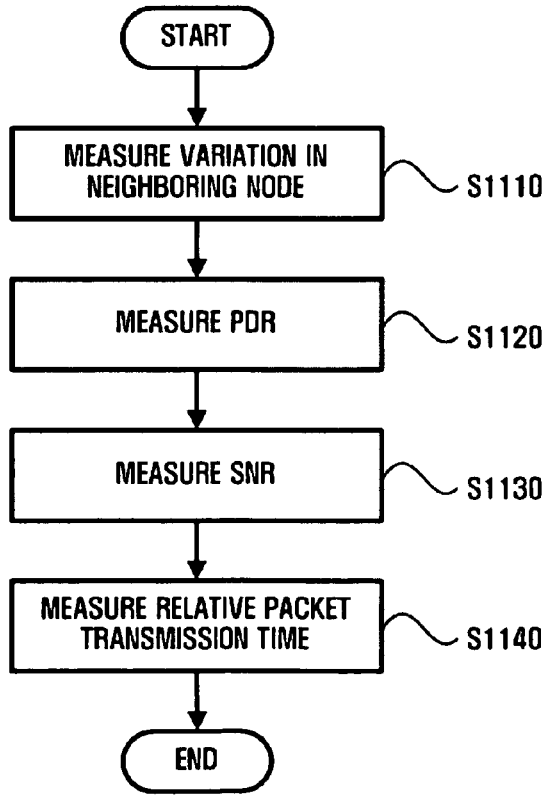
FIG. 11 is a flowchart illustrating a method of measuring relative packet transmission time according to an exemplary embodiment of the invention.

FIG. 11 is a flowchart illustrating in more detail the method of measuring a relative packet transmission time according to an exemplary embodiment of the invention. The method will be described with reference to FIGS. 4 and 11.

A reply packet 482 from the neighboring node 401b is received by the transceiver 450 and sent to the measuring unit 440. The measuring unit 440 uses the received reply packet 482 to measure the relative packet transmission time to the neighboring node 401b.

In operation S1110, the measuring unit 440 measures a movement variation using a variation in the number of neighboring nodes due to their insertion or deletion in order to check the movement status of the node 401b. Insertion or deletion may be verified through an address of the node contained in the reply packet. The movement status of the node 401b classified as stopped or moving using the variation in the number of neighboring nodes is stored in the storage unit 420.

In operation S1120, when the movement status of the node 401b is stored in the storage unit 420, the packet delivery rate measuring unit 530 measures a packet delivery rate according to the movement status of the node.

When the node 401b starts to move, the packet delivery rate measuring unit 530 measures the packet delivery rate using a minimum packet window size. When the node 401b stops, the packet delivery rate measuring unit 530 increases a packet window size gradually to its maximum value according to a packet delivery interval and measures a packet delivery rate. When the node 401b moves, the packet delivery rate measuring unit 530 reduces a packet window size to a minimum and measures a packet delivery rate considering only packets received while the node is moving.

In operation S1130, the SNR measuring unit 520 measures a SNR that will be used to measure a packet transmission time relative to the SNR.

The packet transmission time shown in FIG. 9, or other experimental results, may be used as the packet transmission time relative to the SNR in a network environment supporting multiple bit-rates.

In operation S1140, the packet transmission time relative to the SNR is multiplied by the inverse of the packet delivery rate relative to the movement status of the node 401a to obtain a relative packet transmission time.

The apparatus and method for routing in the mobile ad-hoc network according to the invention provide at least the following advantages.

First, routing in the mobile ad-hoc network according to the invention enables a node to find an optimum routing path in a network environment where a transmission or reception link is asymmetric.

Second, the invention also enables a transmitting node to find a suitable routing path even when the transmitting or receiving node is moving.

Third, the invention can reduce packet transmission time by transmitting a packet through an improved routing path.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. An apparatus for routing in a mobile ad-hoc network, comprising:
   a transceiver that receives a reply packet from a neighboring node;
   a measuring unit that uses the reply packet to measure movement of the neighboring node and a relative packet transmission time thereto; and
   a routing path determination unit that uses the relative packet transmission time to determine a routing path in the network,
   wherein the relative packet transmission time is measured by multiplying an inverse of a packet delivery rate to the neighboring node, measured in accordance with a movement status of the neighboring node, by the packet transmission time to the neighboring node, relative to a signal to noise ratio with respect to the neighboring node, and
   wherein the routing path is an improved routing path for reducing packet transmission time.

2. The apparatus of claim 1, wherein: the transceiver transmits a first packet for measuring a status of a link to the neighboring node; the reply packet is transmitted from the neighboring node in response to the first packet; and the routing path determination unit uses the status of the link to the neighboring node, along with the relative packet transmission time, to determine the routing path.

3. The apparatus of claim 2, wherein the status of the link to the neighboring node contains relative packet transmission time to the neighboring node during transmission and reception.

4. The apparatus of claim 1, wherein the routing path is to a destination node.

5. The apparatus of claim 1, wherein the relative packet transmission time is relative to a signal to noise ratio (SNR).

6. The apparatus of claim 1, wherein the measuring unit comprises:
   a movement status measuring unit that measures the movement of the neighboring node by measuring a variation in the number of other nodes due to their insertion or deletion;
   a packet delivery rate measuring unit that uses the measured variation to measure a packet delivery rate to the neighboring node;
   a signal to noise ratio (SNR) measuring unit that measures an SNR of the reply packet; and
   a relative packet transmission time measuring unit that uses the measured packet delivery rate and the SNR to measure the relative packet transmission time.

7. The apparatus of claim 6, wherein the packet delivery rate is a ratio of a number of normally received packets to a total number of packets transmitted to the neighboring node, within a packet window having a predetermined size.

8. The apparatus of claim 7, wherein, when the neighboring node is moving, the packet delivery rate is a ratio of the number of normally received packets, after the neighboring node moves, to the total number of packets transmitted to the neighboring node, after the neighboring node moves.

9. A method for routing in a mobile ad-hoc network, comprising:
   a first node receiving a reply packet from a neighboring node;
   the first node measuring movement of the neighboring node and relative packet transmission time thereto; and
   the first node determining a routing path in the network using the relative packet transmission time,
   wherein the relative packet transmission time is measured by multiplying an inverse of a packet delivery rate to the neighboring node, measured in accordance with a movement status of the neighboring node, by the packet transmission tame to the neighboring node, relative to a signal to noise ratio with respect to the neighboring node, and
   wherein the routing path is an improved routing path for reducing packet transmission time.

10. The method of claim 9, further comprising:
    the first node transmitting a first packet for measuring a status of a link to the neighboring node, wherein the reply packet is transmitted from the neighboring node in response to the first packet; and
    the first node determining the routing path using the status of the link to the neighboring node, along with the relative packet transmission time, to determine the routing path.

11. The method of claim 10, wherein the status of the link to the neighboring node contains relative packet transmission time to the neighboring node during transmission and reception.

12. The method of claim 9, wherein the routing path is to a destination node.

13. The method of claim 9, wherein the relative packet transmission time is relative to a signal to noise ratio (SNR).

14. The method of claim 9, wherein the measuring of the packet transmission time comprises:
   the first node measuring the movement of the neighboring node by measuring a variation in the number of other nodes due to their insertion or deletion;
   the first node measuring a packet delivery rate to the neighboring node using the measured variation;
   the first node measuring a signal to noise ratio (SNR) of the reply packet; and
   the first node measuring a relative packet transmission time using the measured packet delivery rate and the SNR.

15. The method of claim 14, wherein the packet delivery rate is a ratio of a number of normally received packets to a total number of packets transmitted to the neighboring node within a packet window having a predetermined size.

16. The method of claim 15, wherein, when the neighboring node is moving, the packet delivery rate is a ratio of the number of normally received packets, after the neighboring node moves, to the total number of packets transmitted to the neighboring node, after the neighboring node moves.

* * * * *